R. DUNWODY.
THERMOMETER.
APPLICATION FILED MAR. 8, 1911.
1,018,306. Patented Feb. 20, 1912.
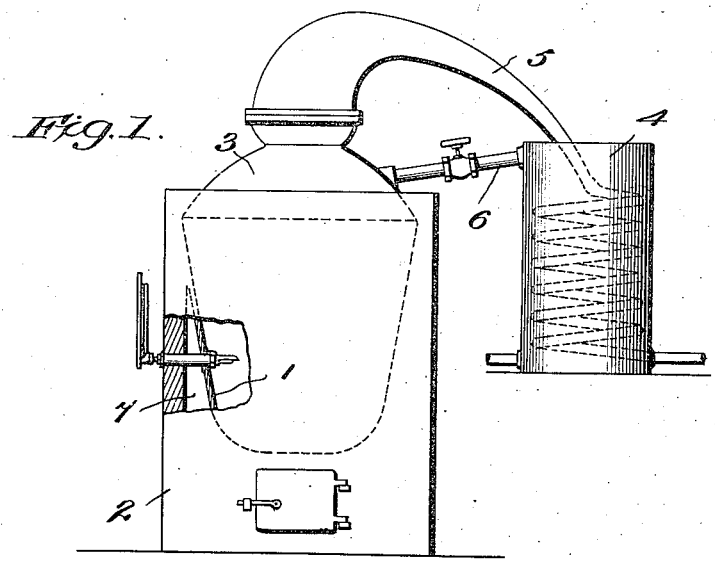
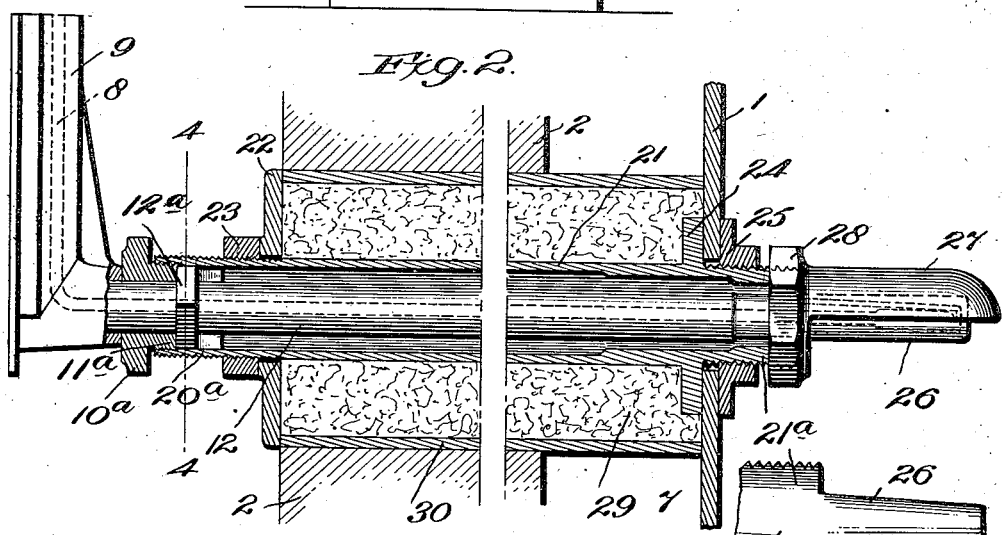
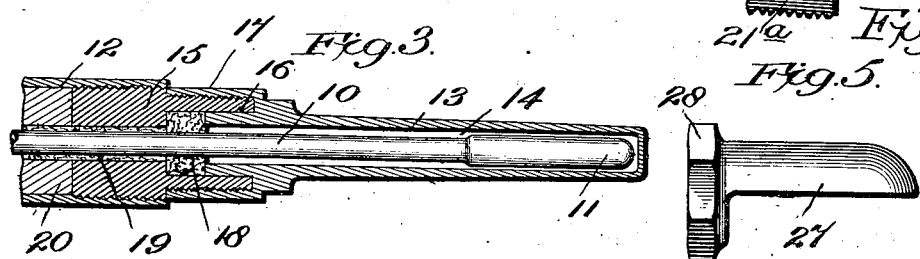
Witnesses
Geo. A. Byrne
H. H. Byrne
Inventor
Robson Dunwody,
by Wilkinson, Fisher & Witherspoon
Attorneys.

UNITED STATES PATENT OFFICE.

ROBSON DUNWODY, OF ATLANTA, GEORGIA.

THERMOMETER.

1,018,306. Specification of Letters Patent. Patented Feb. 20, 1912.

Application filed March 8, 1911. Serial No. 613,073.

*To all whom it may concern:*

Be it known that I, ROBSON DUNWODY, a citizen of the United States, residing at Atlanta, in the county of Fulton and State of Georgia, have invented certain new and useful Improvements in Thermometers; and I do hereby declare the following to be a full, clear, and exact description of the invention, such as will enable others skilled in the art to which it appertains to make and use the same.

The present invention relates to thermometers, especially to angle thermometers of that type employed in connection with the stills of apparatus for treating turpentine. With these thermometers as now constructed it frequently happens that the mercury bulb which projects within the kettle is broken by the paddle in stirring the contents of the kettle, and there is the further disadvantage that leakage of gum through the joint of the extension stem and socket piece gets within the socket and destroys perfect contact between said socket piece and the mercury bulb jacket. To overcome these disadvantages the present invention proposes to provide a protector or shield for the thermometer bulb, and to construct the extension stem and socket member in one piece. Another disadvantage attending the use of these thermometers is the difficulty of obtaining correct readings of the contents of the still due to the fact that the thermometer stem is exposed for a considerable part in the flue surrounding the kettle, the higher temperature within the flue influencing the reading of the thermometer. Another feature of the invention is therefore directed to overcoming this fault by inclosing this exposed portion of the thermometer stem in a steel incased asbestos covering. Finally there is the disadvantage that in removing the thermometers the ignorant help employed usually resort to twisting the whole thermometer casing which results in disconnecting and leaving the mercury bulb jacket inside of the socket piece, thus leaving the glass mercury bulb exposed and liable to breakage when it is withdrawn. To overcome this it is proposed to provide a structure wherein any twisting of the casing will operate simply to turn the casing harmlessly in its mounted position, and wherein the jacket cannot be withdrawn from the socket without first disconnecting and withdrawing the entire sleeve and the contained mercury bulb.

With these and other objects in view the invention consists in the arrangement and combinations of parts hereinafter claimed, and while the invention is not restricted to the exact details shown and described, still for the purpose of disclosure reference is had to the accompanying drawings, in which like characters designate the same parts in the several views, and in which:—

Figure 1 is a side elevation of the apparatus, partly in section, to show the application of the thermometer. Fig. 2 is a longitudinal sectional view, partly in elevation, of the thermometer and its associated parts and showing the manner of mounting the same. Fig. 3 is an enlarged longitudinal sectional view of the projecting bulbed end of the thermometer. Fig. 4 is a transverse sectional view of Fig. 2 taken on the line 4—4. Fig. 5 is a side elevation of the thermometer shield, and Fig. 6 is an elevation of the end of the tube, and socket piece.

Referring to the structure in detail and with like characters referring to the same parts throughout the apparatus consists of a still comprising a kettle 1 supported and inclosed by a masonry structure 2. The still is constructed with the usual dome 3 which communicates with a condenser 4 by the tube 5 in the usual manner. The masonry support 2 provides with the kettle 1 an annular flue 7 for the reducing flame, as shown in Fig. 1.

The thermometer for reading the temperature within the kettle consists of an angle glass tube, the upright leg 8 of which is suitably mounted within the casing 9 and is graduated to give the temperature condition. The horizontal leg 10 of the thermometer is provided with the usual bulbed end 11 and is inclosed within a sleeve 12. The sleeve 12 is provided with a tapering jacket 13 which surrounds the bulbed end 11 and provides a chamber 14 for containing a bath of mercury which insures a quick and perfect transmission of the heat from the kettle 1 through the jacket 13 to the thermometer tube 10 and its contained column of mercury. The connection between the sleeve 12 and the jacket 13 consists of a bushing 15 screw-threaded in said sleeve and having a collar 16 screw-threaded within the cap 17 of the jacket. An asbestos packing 18 which fits within the collar 16 and against the end of the jacket 13 provides a liquid tight joint for the mercury bath; and that portion of the glass mercury tube 10 within the sleeve 12 is covered by a wound asbestos cord 19 and an asbestos packing 20.

The thermometer sleeve 12 and bulb jacket 13 are mounted within a tube 21 and are secured therein by a gland or union nut 10ª that has a screw-threaded connection 11ª with the outer end of said tube. The tube passes horizontally and freely through the masonry wall 2 and kettle wall 1, and is secured therein, at one end, through the medium of a loosely fitting washer 22 and a nut 23 threaded on the tube; and on its inner end by a collar or flange 24 which seats against the outer surface of the kettle wall 1 and a flanged jam nut 25 threaded on the tube, which seats against the interior surface of the kettle. The inner end of the tube 21 or that portion thereof which projects within the kettle is constructed with a tapering socket piece 26 having a closed end and which is adapted to have a close sliding fit with the bulb jacket 13 of the sleeve 12. The opposite or outer end of the tube 21 is designed with a polygonal sided inner surface 20ª adapted to receive, with a close fit, a similarly designed collar 12ª on the sleeve 12. This connection between the sleeve 12 and tube 21 prevents any relative turning movement between them. By constructing the tube 21 and the end socket piece 26 in one piece and securing said tube in the manner shown, it will be obvious that any twisting of the parts will operate merely to turn the whole harmlessly within the mounting; and since there can be no relative turning movement between the sleeve 12 and tube 21, the jacket 13 cannot be disconnected from said sleeve and left within the socket piece 26 and thereby expose the glass bulb 11 to probable breakage when the thermometer is being withdrawn.

In order to protect the inner or exposed end of the thermometer against probable breakage through coming into contact with the paddle when the contents of the kettle 1 is stirred, there is provided a shield 27 consisting of an arched plate fitted with a nut 28 which screws onto the screw-threaded end 21ª of the tube 21. The shield plate is curved concentric with the outer surface of the socket piece 26, and is sufficiently removed from the latter to provide enough space for the convenient flow of the material being treated, and thus overcome any likelihood of clogging which would naturally operate to prevent correct indication of the temperature conditions within the kettle.

It has been found that false readings of the thermometer are caused by the excessive heat within the flue 7 coming into contact with the thermometer casing and to obviate or neutralize this condition the horizontal leg of the thermometer which lies between the kettle wall 1 and the masonry wall 2 is enclosed by an asbestos packing 29 which surrounds the tube 21 and is covered by a metallic cylindrical casing 30. The casing 30 is held flush against the exterior surface of the kettle wall 1 and the outer surface of the masonry wall 2 through the agency of the nut 23, and the loosely fitting washer 22 whose diameter is substantially that of said cylinder, as illustrated in Fig. 2.

What I claim is:—

1. The combination with a still, of a thermometer therefor; a sleeve within which the thermometer is mounted; a tube within which said sleeve is mounted; means for securing said tube within the wall of the still; and an interlocking connection between said sleeve and tube adapted to prevent relative turning movement therebetween, for the purpose set forth.

2. The combination with a still, of a thermometer therefor; a sleeve within which the thermometer is mounted; a tube mounted to have turning movement within the wall of the still, and adapted to receive the thermometer sleeve, and an interlocking connection between said sleeve and tube adapted to prevent relative turning movement therebetween, for the purpose set forth.

3. The combination with a still, of a thermometer therefor; a sleeve within which the thermometer is mounted, a tube mounted to have turning movement within the wall of the still, said tube adapted to receive said sleeve and provided with a polygonal sided surface; and a polygonal sided collar on said sleeve adapted to fit against said surface and form an interlocking connection between said tube and sleeve whereby to prevent relative turning movement therebetween, for the purpose set forth.

4. The combination with a still, of a thermometer therefor; a sleeve within which the thermometer is mounted, said sleeve having a closed jacket piece; a tube provided with a closed socket end piece, said tube adapted to receive said sleeve and provide a space therebetween, and said socket pieces adapted to have a close fit; screw-threaded portions at either end of said tube; a collar formed integral with the tube adjacent one of said screw-threaded portions; a jam nut on said screw-threaded portion adapted to coöperate with said collar to engage a member therebetween; a shield screw-threaded on the inner end of said tube and adapted to overlie the tube socket piece; a washer loosely mounted on the other end of said tube; a nut screw-threaded on said end and adapted to secure said washer against an abutment; polygonal sided portions on said tube and sleeve adapted to interengage and prevent relative turning movement therebetween; and a member screw-threaded on said tube and holding said polygonal portions in engagement, substantially as described.

In testimony whereof, I affix my signature, in presence of two witnesses.

ROBSON DUNWODY.

Witnesses:
 IDA ROBERTS,
 A. C. HILLMAN.